US012632250B2

(12) United States Patent (10) Patent No.: US 12,632,250 B2
Niswonger et al. (45) Date of Patent: May 19, 2026

(54) VERSION MANAGEMENT SYSTEMS, METHODS, AND INTERFACES

(71) Applicant: MASTERCARD INTERNATIONAL INCORPORATED, Purchase, NY (US)

(72) Inventors: Melissa Niswonger, College Park, MD (US); Juan Alejandro Gallegos, Omaha, NE (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 350 days.

(21) Appl. No.: 18/529,314

(22) Filed: Dec. 5, 2023

(65) Prior Publication Data

US 2025/0181347 A1 Jun. 5, 2025

(51) Int. Cl.
*G06F 8/71* (2018.01)
*G06F 9/445* (2018.01)
*G06F 9/54* (2006.01)

(52) U.S. Cl.
CPC ............ *G06F 8/71* (2013.01); *G06F 9/44536* (2013.01); *G06F 9/54* (2013.01)

(58) Field of Classification Search
CPC ........... G06F 8/71; G06F 9/44536; G06F 9/54
USPC ........................................ 717/170
See application file for complete search history.

(56) References Cited

U.S. PATENT DOCUMENTS 6,971,093 B1 * 11/2005 Spring ...................... G06F 8/71
717/170
7,076,496 B1 7/2006 Ruizandrade

| | | |
|---|---|---|
| 7,260,818 B1 | 8/2007 | Iterum et al. |
| 8,359,571 B2 | 1/2013 | Clemm et al. |
| 8,713,550 B2 | 4/2014 | Bhat et al. |
| 9,754,242 B2 | 9/2017 | Klinker et al. |
| 9,880,837 B2 | 1/2018 | Khazanchi et al. |
| 10,296,327 B2 | 5/2019 | Govindaraju et al. |
| 10,459,718 B2 | 10/2019 | Miller et al. |
| 11,599,355 B2 | 3/2023 | Gupta et al. |
| 2004/0162857 A1 * | 8/2004 | Butts ......................... G06F 8/65 |
| | | 707/999.203 |

(Continued)

OTHER PUBLICATIONS

Version control, Wikipedia, 15 pages, 2022, [retrieved on Dec. 16, 2025], Retrieved from the Internet: <URL:https://web.archive.org/web/20221202013843/https://en.wikipedia.org/wiki/Version_control>.*

(Continued)

*Primary Examiner* — Geoffrey R St Leger
(74) *Attorney, Agent, or Firm* — Talem IP Law, LLP

(57) ABSTRACT

A version management system can manage a set of application programming interface (API) calls to different software file case systems including a first software file case system and a second software file case system. In response to certain commands and functionality, the version management system obtains from the set of API calls to the different software file case systems, existence request rules corresponding to the first software file case system and the second software file case system so as to perform an existence check. In addition, the version management system enables version records to be set that have a first version number, a first software file case name, a second software file case name, environment name, and phase name.

20 Claims, 8 Drawing Sheets

(56) References Cited

U.S. PATENT DOCUMENTS

| | | | |
|---|---|---|---|
| 2008/0307393 A1* | 12/2008 | Cartledge | G06F 8/71 |
| | | | 717/120 |
| 2016/0048487 A1 | 2/2016 | Briggs et al. | |
| 2017/0344345 A1* | 11/2017 | Fan | G06F 8/71 |
| 2019/0018670 A1 | 1/2019 | Ramasamy | |
| 2019/0384594 A1 | 12/2019 | Michiyama et al. | |
| 2020/0225938 A1 | 7/2020 | Yuki et al. | |
| 2023/0048088 A1 | 2/2023 | Landman | |

OTHER PUBLICATIONS

International Search Report and Written Opinion issued in International Application No. PCT/US2024/047907, mailed Jan. 13, 2025, 8 pages.
Mohd Nordin Abdul Rahman et al. "Tool for Collaborative Temporal-Based Software Version Management" Feb. 14, 2004, 6 pages, Retrieved from: https://www.semanticscholar.org/paper/Tool-for-collaborative-temporal-based-management-Rahman-Awang/d2b6e02bb047a036bb62d9c38a196f6f376024ea.

\* cited by examiner

100

102    Requirements    104    Design and Development    106    Testing    108    Deployment

110

Version Management System 120

116A — First Software File Case System

112

116B — Second Software File Case System

114 — User Device 1

118 — Application(s)

122 — Display

124 — User Interface

126

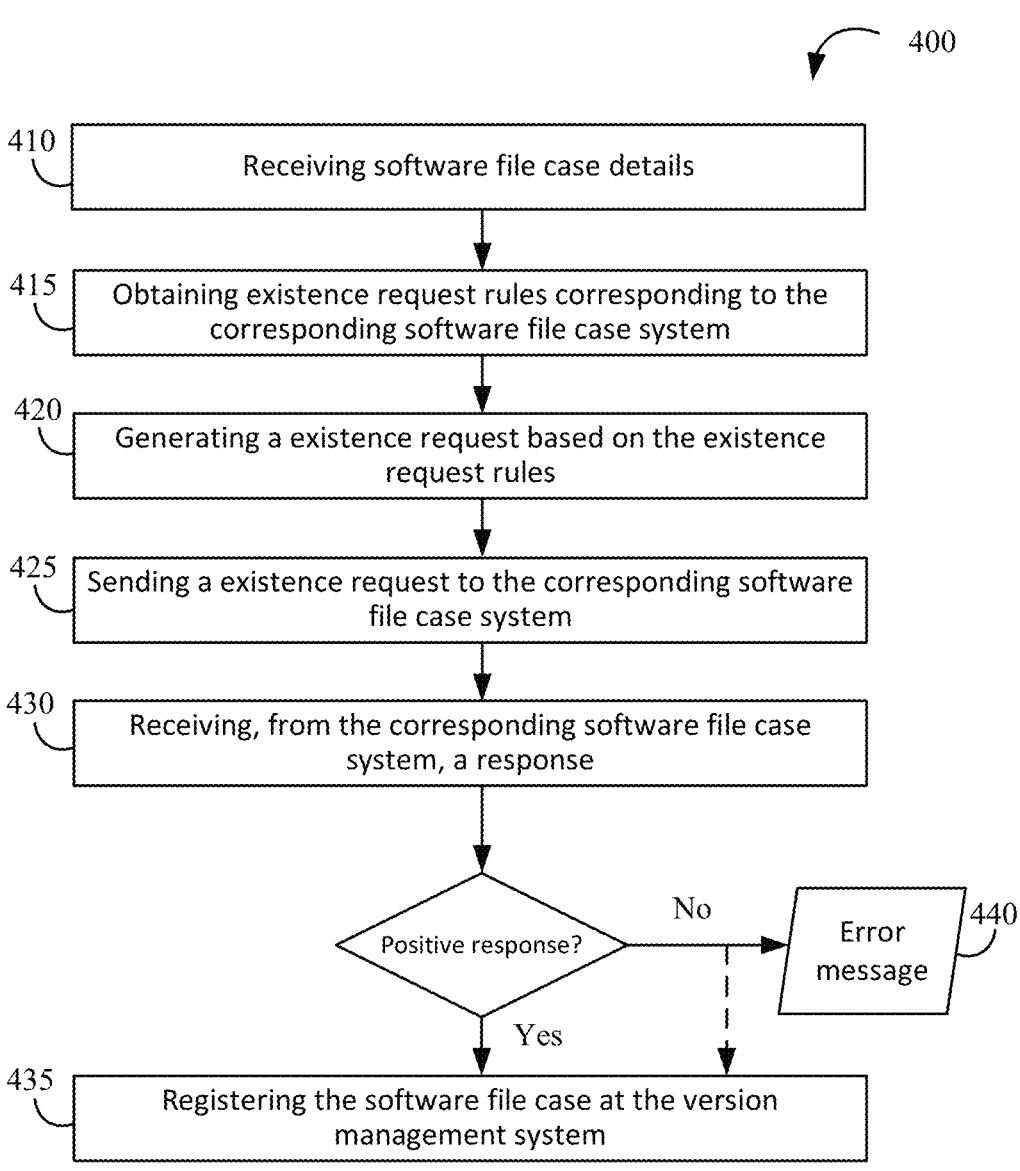

400

410 Receiving software file case details

415 Obtaining existence request rules corresponding to the corresponding software file case system 420 Generating a existence request based on the existence request rules 425 Sending a existence request to the corresponding software file case system 430 Receiving, from the corresponding software file case system, a response Positive response?

No → Error message 440

Yes

435 Registering the software file case at the version management system

Software File Case Registration     465     470

Phase     Environment official     dev
migrating     test
retired     perf
            prod Software file case     new-artifact     455

Software file case system     Habitat     460

Cancel     Save

Software File Case Registration GUI 450

| Application/group | Phase | Environment |
|---|---|---|
| group one<br>group two<br>group three<br>group four | official<br>migrating<br>retired | dev<br>test<br>perf<br>prod |

Artifact Name — new-artifact

Application UUID — 52.2.3

Artifactory group id — com.company.artifact.group repository — releases

Application build URL — this.is.the.url

Deployment tool — Habitat

Deployment build package name — origin/package-name

Deployment package build URL — habitat.build.url application repository URL — application.repo.url Deployment package repository URL — package.repo.url cancel    save

Figure 4C

VERSION MANAGEMENT SYSTEMS, METHODS, AND INTERFACES

BACKGROUND

For companies who develop and deploy multiple applications, it can be challenging to keep track of which version of each application is at which stage in the process. Development teams build the applications, quality assurance teams validate the code function/experience, and release management teams make sure the applications (and updates) get deployed. However, the version minutia (including details native to specific environments) are difficult to track across the different systems used by the different teams. Indeed, the details needing to be tracked are native to several different systems. This can make it challenging to ensure that the correct component is used and validated through the lifecycle of the software application.

BRIEF SUMMARY

Version management systems, methods, and interfaces are described that provide a mechanism for ensuring information accuracy.

A version management system can include a repository of a set of application programming interface (API) calls to different software file case systems; a structured data resource for storing version records, version-pair entries, and software file case entries; and a storage resource storing instructions for a variety of version management tools, including version setting and validation.

A method performed by a version management system includes managing a set of API calls to different software file case systems; receiving a version setting request for a version-pair entry that maps a first software file case to a second software file case; obtaining, from the set of API calls to the different software file case systems, a first set of existence request rules corresponding to a first software file case system from which the first software file case was generated and a second set of existence request rules corresponding to a second software file case system from which the second software file case was generated; communicating with the first software file case system using the first set of existence request rules to confirm that the first software file case exists at the first software file case system; communicating with the second software file case system using the second set of existence request rules to confirm that the second software file case exists at the second software file case system; and upon receiving confirmation that both the first software file case and the second software file case exist at their respective software file case systems, setting a first version record with a first version number, wherein the first version record comprises first version record attributes including the version-pair entry.

The method performed by the version management system can further include creating a version-pair entry by receiving a version-pair creation request, the version-pair creation request comprising the first software file case name and the second software file case name; checking that each software file case, including the first software file case and the second software file case, exists; and creating the version-pair entry for the first software file case name and the second software file case name, wherein the version-pair entry indicates that the first software file case is associated with the second software file case.

The method performed by the version management system can further include registering a software file case by receiving details of a software file case; obtaining, from the set of API calls to the different software file case systems, a corresponding set of existence request rules for the particular software file case system from which the software file case was generated; communicating with the particular software file case system using the corresponding set of existence request rules to confirm that the software file case exists at the particular software file case system; and upon receiving confirmation that the software file case exists at the particular software file case system, store an entry for the software file case.

The method performed by the version management system can further include receiving a promotion approval request for a version-pair, including a version setting request and a promotion type; and performing an existence check of the software file cases identified by the version-pair before processing the promotion approval of the version setting request for the version-pair. The existence check can include obtaining, from the set of API calls to the different software file case systems, the corresponding sets of existence request rules for the software file cases identified by the version-pair and communicating with the corresponding software file case systems using the corresponding sets of existence request rules.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 4A illustrates an example process flow for registering a software file case at a version management system.

FIG. 4C illustrates a specific example of software file case information details that can be provided in a graphical user interface for registering a software file case at version management system.

DETAILED DESCRIPTION

Version management systems, methods, and interfaces are described that provide a mechanism for ensuring information accuracy.

Definitions

A "software file case" refers to files used to install and run a software application and associated or complementary information for configuring or managing the software application. Examples include artifacts (e.g., artifacts created in JFrog Artifactory ("Artifactory")) and deployment packages (e.g., from tools such as Habitat, Pivotal Cloud Foundry (PCF), and flatpack).

A "software file case system" refers to a system that can be used for generating and managing software file cases. A software file case system is used for software development and operations (DevOps). Examples include Jfrog Artifactory, Habitat, PCF, and flatpack.

A "version-pair entry" refers to a recorded relationship between a first software file case and a second software file case. A version-pair entry is a pairing between a first software file case (e.g., an artifact) and a second software file case (e.g., a deployment package), where the second software file case is a deployment package used for deploying the first software file case. The paired data of a version-pair entry includes an environment and phase.

A "version record" refers to a unique state of a software file case and/or version-pair entry assigned a unique version name and/or version number.

A "version attribute" refers to an attribute included in a version record. Version attributes can be used to identify/define a version record. Version attributes include a first software file case name, a second software file case name, a phase, and an environment.

Version management is the practice of tracking and managing changes to software code. Versions of a software file case and/or version-pair entry are frequently different across environments due to the life cycle of the resulting applications. Therefore, there is a need for a tool/system to provide visibility and control to a large set of complex and important information required for multiple versions across multiple applications, which may vary by environment.

Figures 1A, 1B:
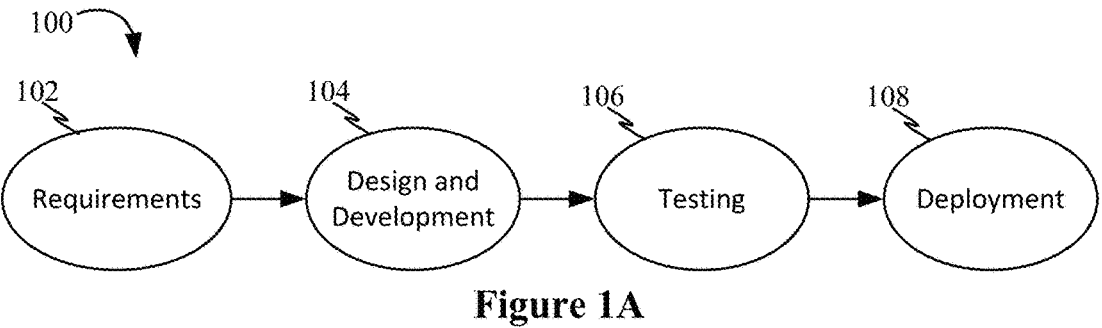
FIG. 1A illustrates a basic software development process flow overview.
FIG. 1B illustrates an example operating environment of a version management system.

FIG. 1A illustrates a basic software development process flow overview. Referring to FIG. 1A, during a software lifecycle, the software development process flow 100 includes setting requirements 102, design and development 104, testing 106, and deployment 108. These stages can be repeated for an application's updates to provide new features, fix bugs and errors found during use in the production environment, and address new security vulnerabilities.

As mentioned above, there can be numerous details and components that are native to several different systems used by the different teams involved in various stages of the software development process flow 100. Indeed, the files used to install and run a software application and associated or complementary information for configuring or managing the software application ("software file case") are typically native to a specific system ("software file case system"). This can make it difficult to track the version minutia of the various software case files for a specific software application across the different systems. For example, a software application may use artifacts built in Artifactory and deployment packages built in Habitat and those separate environments may be used by different teams.

A version managements system as described herein can be used by the different teams to ensure that information is accurate and working through the software development process flow 100.

FIG. 1B illustrates an example operating environment of a version management system. Referring to FIG. 1B, operating environment 110 of version management system 120 can include various computing systems on a network 112. One or more user devices, such as first user device 114, can access the version management system 120 and one or more software file case systems (e.g., first software file case system 116A and second software file case system 116B) on the network 112.

The network 112 can be, but is not limited to, a cellular network (e.g., wireless phone), a point-to-point dial up connection, a satellite network, the Internet, a local area network (LAN), a wide area network (WAN), a Wi-Fi network, an ad hoc network, or a combination thereof. Such networks are widely used to connect various types of network elements, such as hubs, bridges, routers, switches, servers, and gateways. Network 112 may include one or more connected networks (e.g., a multi-network environment) including public networks, such as the Internet, and/or private networks such as a secure enterprise private network. Access to the network 112 may be provided via one or more wired or wireless access networks as will be understood by those skilled in the art.

As mentioned above, users on the various teams can develop (and deploy) software applications using various systems in a development environment. For example, first user device 114 can include one or more applications 118 such as a web browser, front end application, or full application that can interface with/access the various systems on the network 112. User device 114 may be embodied as any suitable computing device including, but not limited to, a laptop computer, desktop computer, tablet, and the like. Display 122 of the user device 114 can be any suitable display device and may include multiple monitors, an integrated display, a projection display, etc. In some cases, display 122 can be a touch screen device. It should be apparent that the user device 114 may be any type of computer system that provides the ability to load and execute software programs, the ability to display or otherwise output a user interface, and the ability to access a network, such as network 112. Development, design, and deployment activities can be carried out by a user on the one or more user devices in the operating environment 110 using at least one of the one or more applications 118. For example, one of the application(s) 118 can enable a developer to access a first software file case system 116A (e.g., Artifactory) and/or a second software file case system 116B (e.g., Habitat).

Figure 4B:
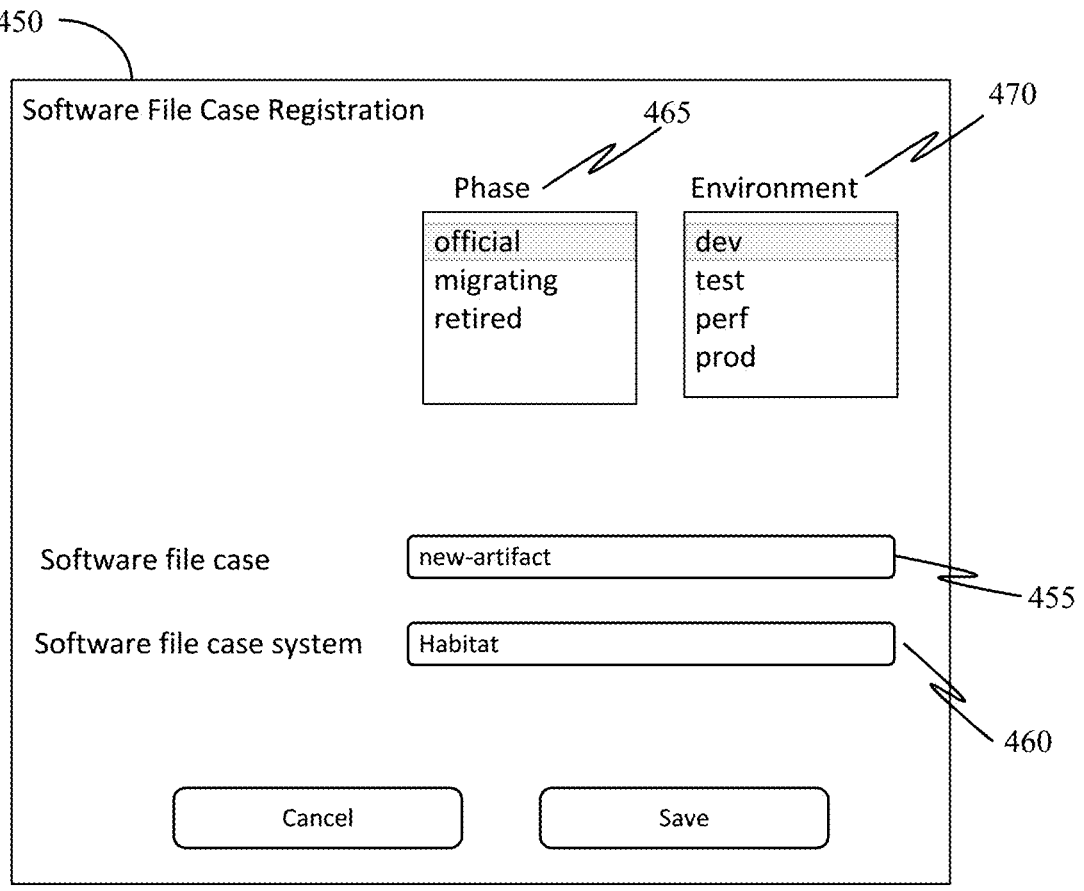
FIG. 4B illustrates an example graphical user interface for registering a software file case at a version management system.

Using a same or different computing device as that used for the development environment, a user 126 may interact with the version management system 120 through a user interface (UI) 124 displayed on a display 122 associated with the user device 114. Examples of certain functionality of the UI 124 for the version management system 120 are shown in FIGS. 4B and 4C. The version management system 120 may be implemented as described with respect to FIG. 1C.

Figure 1C:
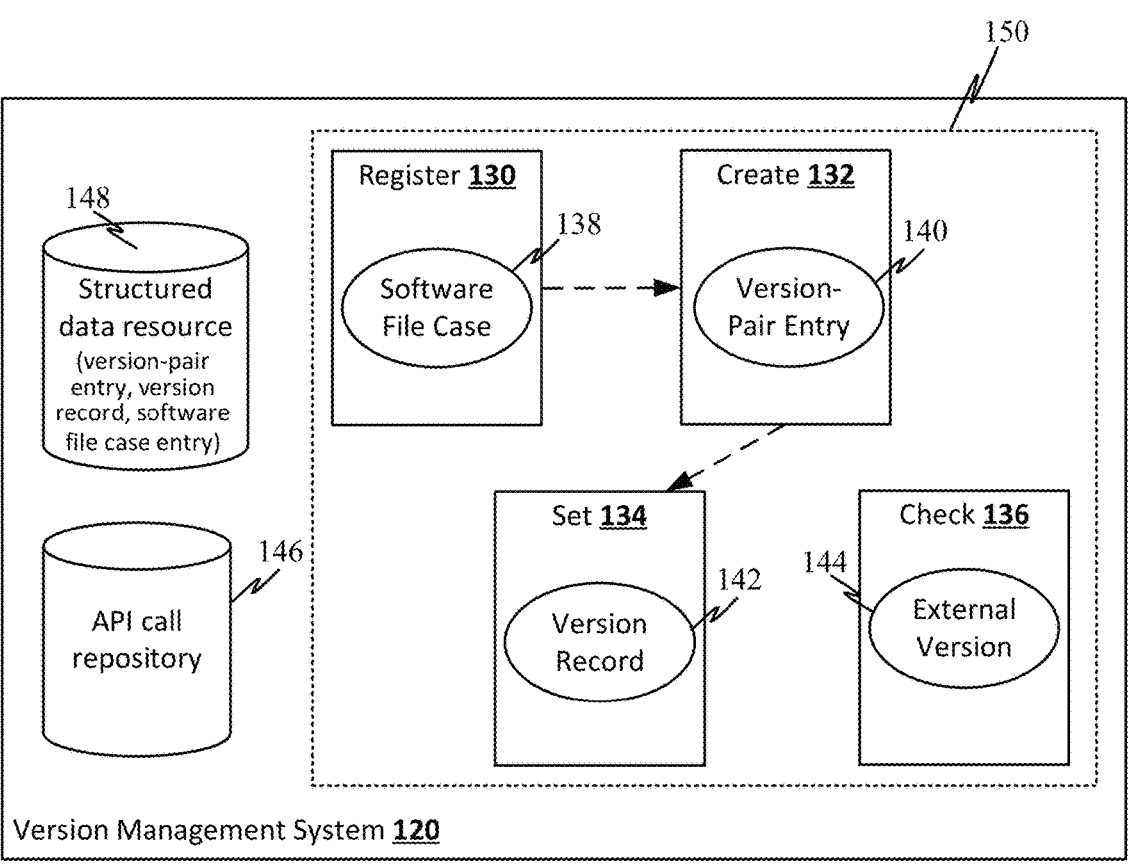
FIG. 1C is a representational diagram of a version management system.

FIG. 1C is a representational diagram of a version management system. Referring to FIG. 1C, version management system 120 can include a repository 146 of a set of application programming interface (API) calls to the different software file case systems (e.g., first software file case system 116A and second software file case system 116B of FIG. 1B); a structured data resource 148 for storing version records, version-pair entries, and software file case entries; a storage resource 150 storing instructions for a variety of version management tools, including version setting and validation; and a processing system (not shown) that executes the instructions stored at the storage resource 150. Version management system 120 (including the processing system) can be embodied as any suitable computing system or systems with one or more hardware processors (e.g., CPU(s), GPU(s), FPGA(s), and the like) and one or more storage systems (e.g., with removable and non-removable memory implemented with memory devices such as SRAM, DRAM, ROM, flash, magnetic-based, etc.). Repository 146, structured data resource 148, and storage resource 150 may be, but are not limited to being, part of a same storage resource or system, part of a distributed or cloud-based storage resource or system, or separate storage resource or systems.

The version management system 120 maintains and manages a set of API calls to different software file case systems in the API call repository 146. This enables the version management system 120 to communicate with the different software file case systems in a manner that each software file case system understands. In some cases, the API call repository 146 includes templates for the particular calls and the instructions (e.g., stored at storage resource 150) convert or otherwise identify the terms used in the templates for the particular calls. The API call repository 146 can be updated as new software file case systems are added to the development/data management environments.

An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API is generally a set of programming instructions and standards or enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture.

The version management system 120 can act as a source-of-truth for versions by not only maintaining records of the various parts of an application (e.g., version records, version-pair entries, and software file case entries), but also by interfacing with software file case systems (e.g., first software file case system 116A, second software file case system 116B shown in FIG. 1B) to ensure that the software file cases a version exist and/or are deployable at the software file case system corresponding to a given software file case registration/entry.

As illustrated in FIG. 1C, the instructions stored at the storage resource 150 includes the functionality to register 130, create 132, set 134, and check 136. The functionality of the version management system 120 can be used during a number of different stages of the software development process flow 100, as illustrated in FIG. 1A. For example, during design and development 104, the version management system 120 may be accessed to register 130 a software file case (e.g., via process 400 of FIG. 4A), create 132 a version-pair entry (e.g., via process 300 of FIG. 3), and/or set 134 a version record (e.g., via process 200 of FIG. 2 or via process 500 of FIG. 5). During deployment 108, the version management system 120 may be accessed to perform version checking 136 (e.g., via process 600 of FIG. 6).

With reference to FIGS. 1B and 1C, during the software development process, a software file case 138 is generated at a corresponding software file case system (e.g., first software file case system 116A or second software file case system 116B). The version management system Register 130 functionality can be used to register the software file case 138 and, once registered, the software file case name (and associated information) is stored as a software file case entry in the structured data resource 148. FIG. 4A illustrates an example process 400 for registering a software file case 138 at a version management system 120.

Figure 1D:
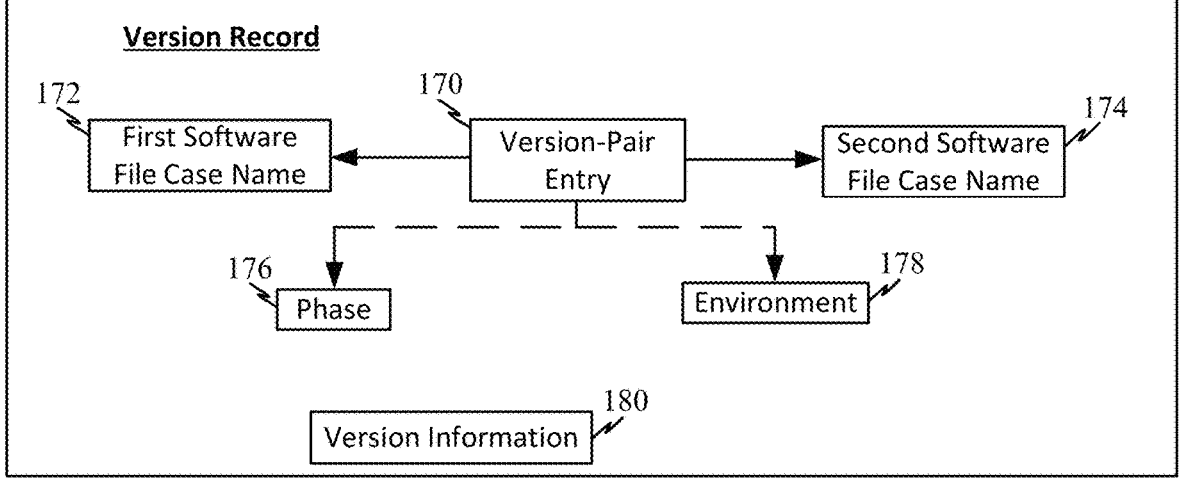
FIG. 1D is a conceptual representation of an example version record at a version management system.
Figure 3:
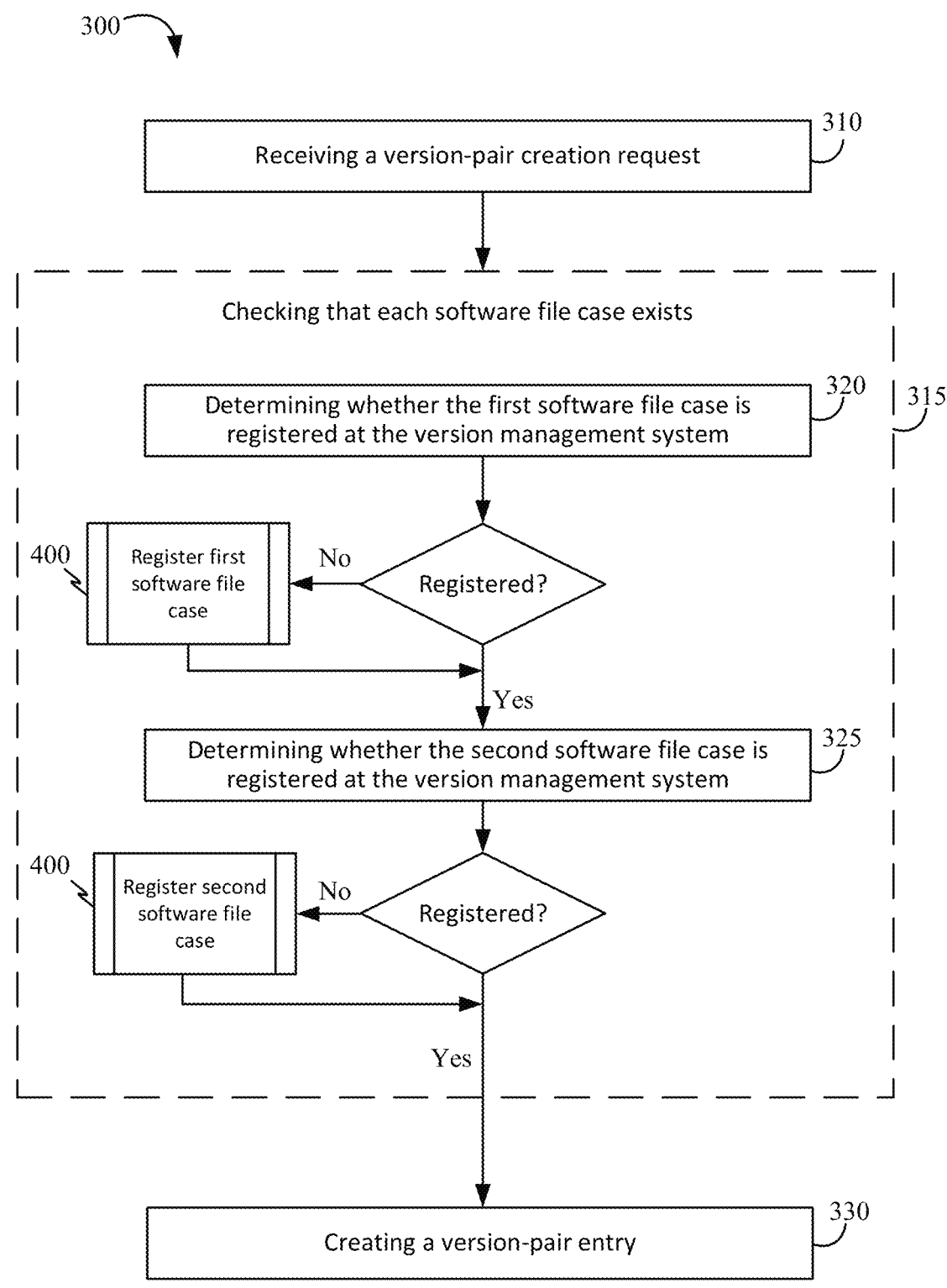
FIG. 3 illustrates an example process flow for creating a version-pair entry at the version management system.

The version management system create 132 functionality can be used to create a version-pair entry 140. The version-pair entry 140 identifies, at the version management system 120, a relationship between at least two different registered software file cases. For example, version-pair entry 140 defines a relationship between a first software file case and a second software file case. Each version-pair entry 140 can, in addition to having a first software file case name and a second software file case name, further include a phase and environment such as shown in FIG. 1D. A phase (e.g., phase 176 of FIG. 1D) refers to a development phase for a software file case. By using phases, a single software file case can be built in different versions for use with different software file cases (e.g., a single artifact can be built in different versions for use with different development tools). Examples of a phase include current, migrating, and retired. Phases allow for the management of migration from one deployment tool to another. An environment (e.g., environment 178 of FIG. 1D) indicates a particular environment for deployment of the version record 142 created based on the version-pair entry 140. Example environments include dev, test, performance, and prod. FIG. 3 illustrates an example process 300 for creating a version-pair entry 140 at a version management system 120.

Figure 2:
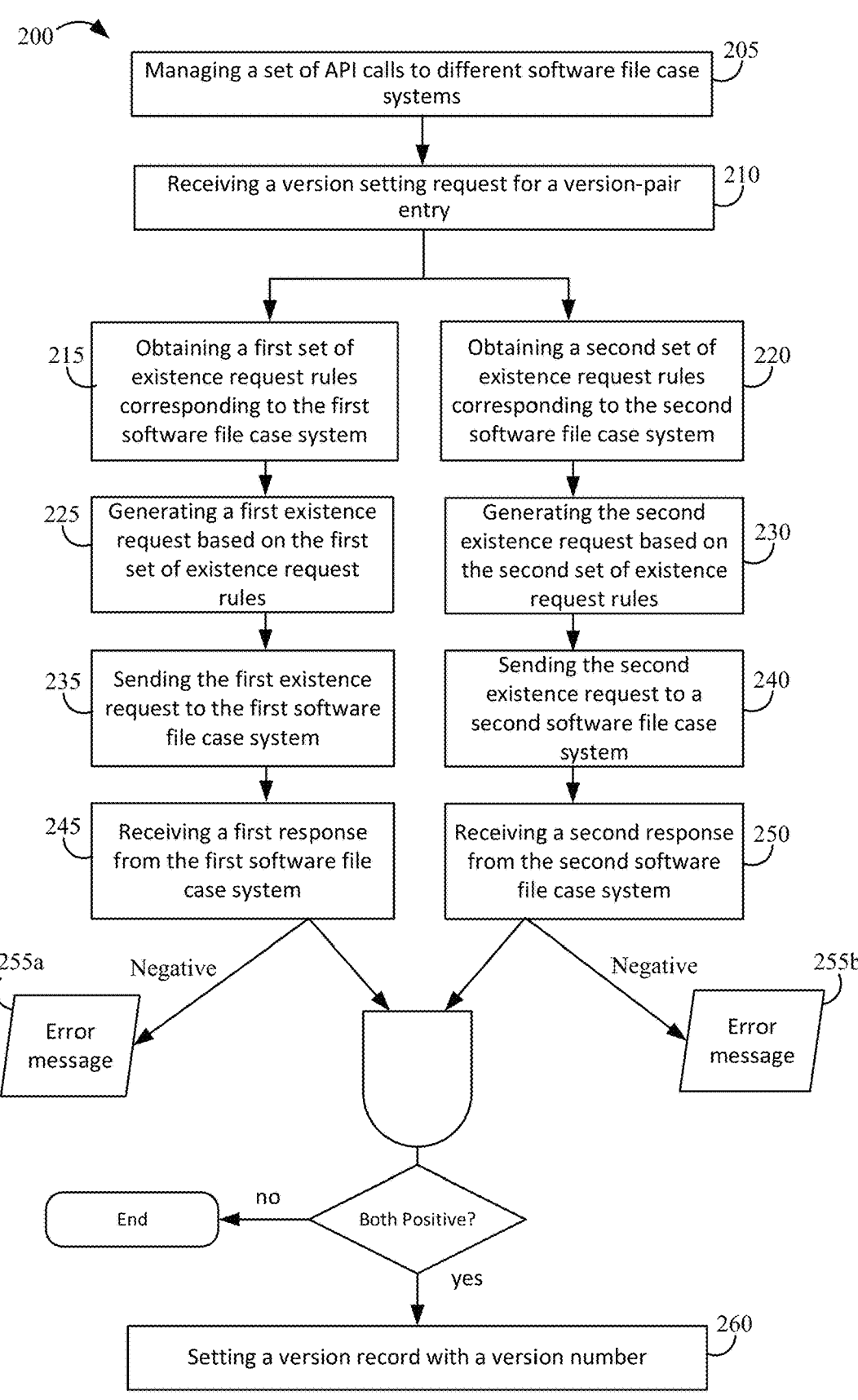
FIG. 2 illustrates an example process flow for setting a version record at a version management system based on a version-pair entry.
Figure 5:
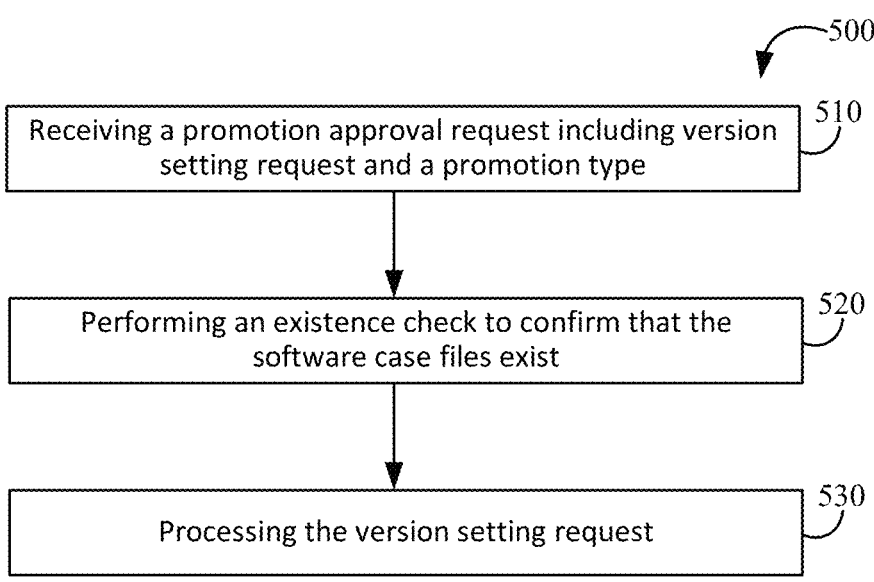
FIG. 5 illustrates an example process flow for processing an approval request and setting a version record.

The version management system set 134 functionality can be used to set a version record 142. FIG. 2 illustrates an example process 200 for setting a version record 142 at a version management system 120. In some cases, a version record 142 can be set 134 at the version management system 120 via a promotion approval process such as described with respect to process 500 as shown in FIG. 5.

FIG. 1D is a conceptual representation of an example version record at a version management system. A version record (e.g., version record 142 of FIG. 1C) identifies a unique state of a version-pair entry 170 (e.g., version-pair entry 140 of FIG. 1C). Referring to FIG. 1D, for the case of a version record identifying a state of a version-pair entry 170, the version record can include a first software file case name 172, a second software file case name 174, a phase 176, and an environment 178. The version record can also include version information 180 that includes a unique version number for the version-pair entry 170 and may even include history, last accessed information, and the like. For example, a version record can include fields for version-pair entry 170 (which can be considered the version-pair entry record identifier), the first software file case name 172, the second software file case name 174, the phase 176, the environment 178, and version number (e.g., of version information 180).

Figure 6:
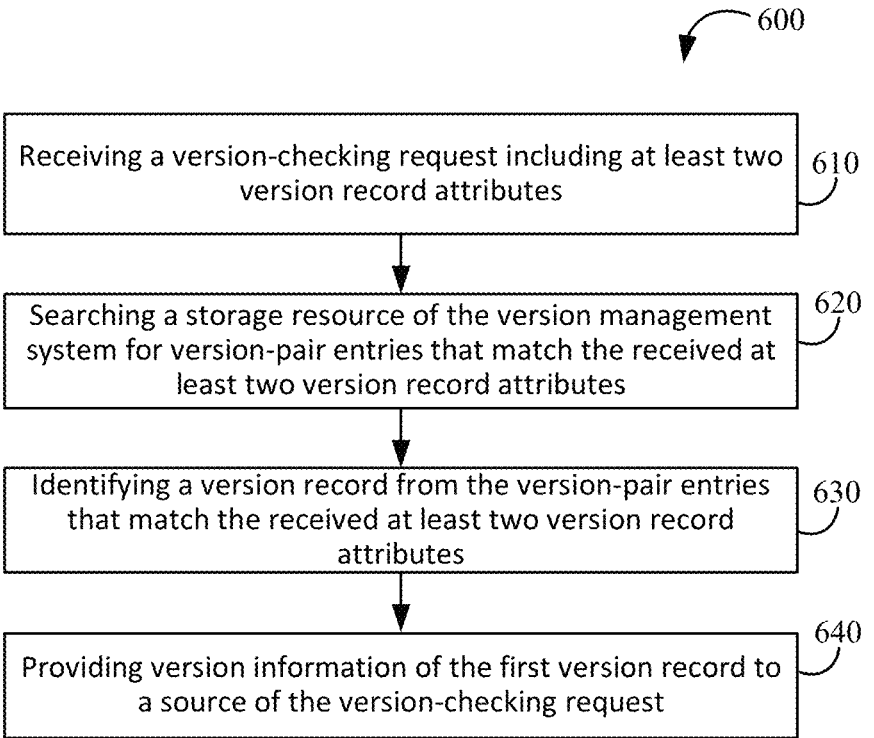
FIG. 6 illustrates an example process flow for processing a version-checking request.

Returning to FIG. 1C, the version management system check 136 functionality can be used to validate version information of a requested version ("external version" 144) during a deployment stage of the software development process. Checking an external version 144 includes determining whether an implementation of an external version 144 deployed at an external device corresponds to a "correct version" as recorded by the version management system 120. FIG. 6 illustrates an example process 600 for checking a version at a version management system 120.

As indicated above, a version management system includes (but is not limited to) functionality for registering software file cases, creating version-pair entries of related file cases, setting version records, and checking version records. Once software file cases are registered and version-pair entries are created, it is possible to set version records (for later checking during various stages of the software development process).

FIG. 2 illustrates an example process flow for setting a version record at a version management system based on a version-pair entry. Referring to process 200, the version management system manages (205) a set of API calls to different software file case systems. The API calls can be stored in an API call repository at the version management system (e.g., API call repository 146 at version management system 120 as described with respect to FIG. 1C).

The version management system can receive (210) a version setting request for a version-pair entry (e.g., version-pair entry 140 as described with respect to FIG. 1C or version-pair entry 170 as described with respect to FIG. 1D). The version-pair entry includes a first software file case name and a second software file case name. The first software file case name is associated with a first software file case generated at the first software file case system and the second software file case name is associated with a second software file case generated at the second software file case system.

In response to receiving the version setting request, the version management system can obtain (215), from the set of API calls to the different software file case systems, a first set of existence request rules corresponding to the first software file case system and can obtain (220), from the set of API calls to the different software file case systems, a second set of existence request rules corresponding to the second software file case system. In some cases, the first set of existence request rules is different from the second set of existence request rules.

The version management system can generate (225) a first existence request based on the first set of existence request rules and can send (235) the first existence request to the first software file case system corresponding to the first software file case. The version management system can generate (225) a second existence request based on the second set of existence request rules and can send (240) the second existence request to the second software file case system corresponding to the second software file case.

The version management system can receive (245) a first response from the first software file case system. The first response can be a positive response or a negative response. A positive response indicates that the first software file case exists at the first software file case system. A negative response to the existence request indicates that the first software file case does not exist at the first software file case system and/or is not available for deployment.

In response to receiving a negative response from the first software file case system, the version management system can generate (255a) an error message indicating that the version setting request has failed and stops process 200. In some cases, the error message includes the reason for failure (e.g., first software file case not existing and/or not available for deployment).

The version management system can receive (250) a second response from the second software file case system. As with the first response, the second response can be a positive response or a negative response. The positive response indicates that the first software file case exists at the first software file case system. The negative response to the existence request indicates that the first software file case does not exist at the first software file case system and/or is not available for deployment.

In response to receiving a negative response from the second software file case system, the version management system can generate (255b) an error message indicating that the version setting request has failed and stops process 200. In some cases, the error message includes the reason for failure (e.g., first software file case not existing and/or not available for deployment).

If both the first response and the second response are positive responses, the version management system can set (260) a version record with a version number. The version record includes version record attributes (e.g., the first software file case name 172, the second software file case name 174, the phase 176, the environment 178, and version number as described with respect to version-pair entry 170 of FIG. 1D). In some cases, the version number is different from a pre-existing version number. By confirming the existence of the first software file case and the second software file case at the first software file case system and the second software file case system, respectively, the version management system ensures that a version record set at the version management system includes existing and deployable assets (e.g., first software file case and second software file case).

It should be understood that while operation 205 is shown as part of process 200, operation 205 is performed asynchronously with (and can be considered in various implementations separate from) all of the functions including setting a version record, registering a software file case, creating a version-pair entry, and checking versions.

Accordingly, in a version setting request scenario, the version management system performs a method including receiving (210) a version setting request for a version-pair entry, wherein the version-pair entry includes: a first software file case name that is associated with a first software file case generated at the first software file case system and a second software file case name that is associated with a second software file case generated at the second software file case system; obtaining (215, 220), from the set of API calls to the different software file case systems, a first set of existence request rules corresponding to the first software file case system and a second set of existence request rules corresponding to the second software file case system; generating (225) a first existence request based on the first set of existence request rules, wherein the first existence request comprises the first software file case name; sending (235) the first existence request to the first software file case system; receiving (245), from the corresponding first software file case system, a first positive response, the first positive response indicating that the first software file case exists at the first software file case system; generating (230) a second existence request based on the second set of existence request rules, wherein the second existence request comprises the second software file case name; sending (240) the second existence request to the second software file case system; receiving (250), from the second corresponding software file case system, a second positive response, the second positive response indicating that the second software file case exists at the second software file case system; and upon receiving both the first positive response and the second positive response, setting (260) a first version record with a first version number at the version management system, wherein the first version record comprises first version record attributes of the version-pair entry.

The following is an example scenario illustrating process 200. For example, the version management system may receive (210) a version setting request where the version setting request includes a version-pair entry identifying "Artifact 1" as the first software file case name and "Habitat 1" as the second software file case name. Artifact 1 is managed by Artifactory (e.g., first software file case system) and Habitat 1 is managed by Habitat (e.g., second software file case system).

The version management system obtains (215) a first set of existence rules corresponding to Artifactory. For example, Artifactory may require an Artifactory group identification number and the artifact name in a request to confirm that Artifact 1 exists. After obtaining (215) the first set of existence rules, the version management system generates (225) a first existence request including an Artifactory group identification and an artifact name. The version management system sends (235) the first existence request to Artifactory and receives (245) a first response from Artifactory. The received (245) first response may be a negative first response (indicating that either the Artifactory group identification does not exist or that the artifact does not exist). If a negative first response is received (245), the version management system can generate (255a) an error message and stop the version setting process 200.

The received (245) first response may be a positive first response (indicating that the Artifactory group identification and the artifact exist at Artifactory).

However, the version management system does not set the version record unless both a first positive response (e.g., from Artifactory) and a second positive response (e.g., from Habitat) are received.

The version management system obtains (220) a second set of existence rules corresponding to Habitat. For example, Habitat may require an origin and a deployment package name. After obtaining (220) the second set of existence rules, the version management system generates (225) a second existence request including an origin identification and a deployment package name. The version management system sends (240) the second existence request to Habitat and receives (250) a second response from Habitat. The received (250) second response may be a negative first response (indicating that either the origin identification does not exist or that the deployment package does not exist). If a negative second response is received (250), the version management system can generate (255b) an error message and stop the version setting process 200.

The received (250) second response may be a positive second response (indicating that the origin identification and the deployment package exist at Habitat).

In response to receiving (245) a positive first response from Artifactory and receiving (250) a positive second response from Habitat, the version management system can set (260) a version record with a version number 1.0.0, the version record identifying Artifact 1 and Habitat 1 collectively as version 1.0.0. In some cases, the version setting request further includes information of phase and environment, for example, indicating the phase is "current" and the environment is "dev." In such cases, upon the positive responses from the existence requests, the version record can include the information of the phase and environment for the version-pair entry.

In the above-described processes, the version-pair entry may or may not exist at the version management system from performing process 300 and the software file cases may or may not already be registered from performing process 400. In any case, during version setting, the software file cases are checked to ensure that they exist at their respective software file case systems. In addition, as a pre-step for setting a version record for a version-pair entry, the version management system confirms that a version-pair entry exists at the structured data resource (e.g., resource 148). If the version-pair entry does not exist, then the process 300 for creating a version-pair entry can be invoked either automatically or in response to a user command. If the software file case entry does not exist, the process 400 for registering a software file case can be invoked (automatically or in response to a user command).

The processes of registering a software file case and creating a version-pair entry may be performed in response to a user command during the development process as seen fit by users of the version management system.

FIG. 3 illustrates an example process flow for creating a version-pair entry at the version management system. Referring to FIG. 3, for process 300, the version management system can receive (310) a version-pair creation request. The version-pair creation request includes a first software file case name and a second software file case name.

In response to receiving (310) the version-pair creation request, the version management system checks (315) that each software file case included in the version-pair creation request exists. After checking (315) that each software file case exists, the version management system creates (330) a version-pair entry.

The version-pair entry includes any version attributes included in the version-pair creation request. Version attributes can include a software file case name, a phase, an environment, etc. For example, in the example provided in process 300, the version-pair creation request includes a first software file case name and a second software file case name. Therefore, the version-pair entry recorded by the version management system will include the first software file case name and the second software file case name. The version-pair entry identifies to the version management system that the first software file case is associated with the second software file case. In some cases, the version-pair entry is given an identification number (e.g., a version number). In some cases, the identification number (e.g., a version number) given to the version-pair entry is a placeholder version number (e.g., until a version record is generated as part of the set 134 version record functionality such as described with respect to FIG. 1C and FIG. 2).

Checking (315) that each software file case exists can include determining (320) whether the first software file case is registered at the version management system and determining (325) whether the second software file case is registered at the version management system. The version management system can determine whether a particular software file case is registered by searching the structure data resource for the software file case entry of the particular software file case. If either the first software file case and/or the second software file case is not registered in the version management system, the version management system can automatically register the first software file case and/or the second software file case at the version management system (e.g., via process 400 of FIG. 4A).

FIG. 4A illustrates an example process flow for registering a software file case at a version management system. Referring to process 400, the version-management system can receive (410) software file case details. In some cases, process 400 can also include receiving a registration request via a registration view at a graphical user interface of the version management system, for example as illustrated in FIGS. 4B and 4C.

The software file case details can include a software file case name (attributed to a software file case) and the software file case system managing the software file case. In some cases, the software file case details include, but are not limited to, a phase, an environment, a software file case identification number, an application build URL, a deployment package (e.g., second software file case), a deployment build package name, a deployment build package URL, an application repository URL, and a deployment package repository URL.

After receiving (410) software file case details (e.g., after being entered via the graphical user interface), the version management system obtains (415), from a set of API calls to different software file case systems, existence request rules corresponding to the software file case system. The API calls to different software file case systems can be stored at the version management system, for example, the API calls can be stored in an API call repository (e.g., API call repository 146 as described with respect to FIG. 1C).

After obtaining (415) the existence request rules corresponding to the software file case system, the version management system can generate (420) an existence request based on the existence request rules and send (425) the existence request to the corresponding software file case system. An existence request seeks to determine whether a software file case exists at a corresponding software file case. The existence request validates the software file case's existence and/or whether the software file case is deployable at the corresponding software file case system.

Process 400 continues when the version management system receives (430), from the corresponding software file case system, a response. In some cases, the response is positive and in some cases the response is negative. A positive response to the existence request indicates that the software file case exists. A negative response to the existence request indicates that the software file case does not exist and/or is not deployable at the software file case system.

If the version management system receives a positive response, the version management system registers (435) the software file case at the version management. The registered software file case is registered with a software file case name, such that the version management system stores the software file case name and any corresponding information (as opposed to storing the software file case itself). If the version management system receives a negative response, the version management system can generate (440) an existence error message and cause the existence error message to be displayed. The existence error message provides a notification, so that a user is aware that the software file case does not exist and/or is not deployable. However, despite the negative response, in some cases, the version management system can still register the software file case at the version management system (represented by dotted line in FIG. 4A) because, during registration of a software file case performed by process 400, the version management system is simply recording the software file case (e.g., as opposed to setting a version).

FIG. 4B illustrates an example graphical user interface for registering a software file case at a version management system. The software file case registration GUI 450 provides GUI fields for a user to enter software file case information. The software file case information is information required to register the software file case at the version management system. In the simple representation shown in FIG. 4B, the software file case information includes a software file case name 455, the corresponding system (e.g., tool) 460, a phase 465, and an environment 470. Of course, more or fewer fields may be included.

The phase 465 indicates a development "phase" for the software file case being registered. Using phases allows for the same software file case (e.g., an artifact) to be built in different versions (e.g., set as different version records) for use with different second software file cases (e.g., deployment packages from tools such as Habitat) for different environments. Examples of a phase 465 include "current", "migrating", and "retired". In some cases, a default phase 465 is "current".

The environment 470 indicates a particular environment for deployment of the software file case associated with the software file case information. Examples of an environment include dev, test, performance, and prod.

FIG. 4C illustrates a specific example of software file case information details that can be provided in a graphical user interface for registering a software file case at version management system. Referring to FIG. 4C, the software file case registration GUI 450 may be used to register an artifact (e.g., new-artifact). In the example illustrated in FIG. 4C, the software file case registration GUI includes several fields for registration information, including application/group, phase, environment, artifact name (e.g., first software file case name), application UUID, Artifactory group id, repository, application build URL, deployment package (e.g., second software file case name), deployment build package name, deployment package build URL, application repository URL, deployment package repository URL.

As mentioned above, there are various functionalities available at the version management system. The functionality can be accessed at different stages of a software development process and said functionality can be accessed by other applications in addition to directly through a user interface to the version management system.

FIG. 5 illustrates an example process flow for processing an approval request and setting a version record. In some cases, it may be desirable to have an approval process for setting a version record or making changes to an existing version record.

Referring to FIG. 5, process 500 can begin when the version management system receives (505) a promotion approval request. The promotion approval request can include a version setting request and a promotion type. In some cases, the version setting request includes a particular version-pair entry. In some cases, the promotion type is a request to change the phase (e.g., current to retired). In some cases, the promotion type is a request to set the version with a version number (or assign an existing version record with a new version number). In some cases, the promotion type is a request to change the environment. The version setting request portion of the promotion approval request can invoke certain operations of process 200 described with respect to FIG. 2.

That is, in response to receiving (510) the promotion approval request, the version management system performs an existence check (520) of the software file cases identified in the version setting request (e.g., the software file cases identified by the version-pair entry) to confirm that the software file cases identified in the version setting request exist; and upon confirming that the software file cases exist, processing (530) the version setting request for the version-pair entry (which can include updates to version, phase, environment, etc.).

In some cases, the existence check (520) includes operations 215, 220, 225, 230, 235, 240, 245, and 250 (and 255a, 255b when the software file cases do not exist) as described with respect to FIG. 2. For example, the existence check (520) can include obtaining, from the set of API calls to the different software file case systems, the first set of existence request rules corresponding to the first software file case system and the second set of existence request rules corresponding to the second software file case system; generating a first existence request based on the first set of existence request rules; sending the first request to the first software file case system; receiving, from the first software file case system, a first response indicating that the first software file case exists; generating a second existence request based on the second set of existence request rules; sending the second existence request to the second software file case system; and receiving, from the second software file case system, a second response indicating that the second software file case exists.

In some cases, processing (530) the version setting request for the specified version-pair entry includes setting a version record with a version number. In some cases, the processing of the version setting request further includes receiving approval to promote the specified version-pair and upon receiving approval to promote the specified version-pair, setting a version record with a corresponding version number at the version management system, wherein the version record includes version record attributes of the specified version-pair entry and the promotion type.

Advantageously, the promotion approval request is not processed until it has been validated (e.g., confirming that the software file cases exist). In many cases, the promotion approval request may be a request for an authorized user to approve the contents within the promotion approval request. In some cases, the authorized user may be responsible for many promotion approval requests at one time.

By confirming the existence of the software file cases prior to processing the version setting request, the overall volume of promotion approval requests processed for approval is diminished. Furthermore, because only validated promotion approval requests are processed for approval, time and resources are saved because there is no waste in approving promotion approval requests which include unusable or non-existing components (e.g., first software file case).

Furthermore, as mentioned above, the version management system may be accessed to perform version checking at any time to confirm what version and/or software case files are in use. For example, the version management system can be accessed to verify an external version of a software application existing at an external device. In some cases, the version management system has a particular version record of a software application indicated as the "correct" version (e.g., the recommended version for deployment). The information of the "correct" version record can be leveraged with information provided regarding the external version to determine whether the external version matches with the "correct" version.

FIG. 6 illustrates an example process flow for a version-checking request. Referring to FIG. 6, performing process 600, the version management system can receive (610) a version-checking request. The version-checking request includes at least two version record attributes. In some cases, the version-checking request is for a version-pair entry (e.g., version-pair entry 170 described with respect to FIG. 1D). In response to receiving (610) a version-checking request, the process 600 includes searching (620) a storage resource of the version management system (e.g., structured data resource 148 as described with respect to FIG. 1C) for version-pair entries that match the received at least two version record attributes. The version management system can then identify (630) a version record from the version-pair entries that match the received (610) at least two version record attributes. The version management system can provide (640) version information of the version record to a source of the version-checking request. The version management system is able to identify a record based on at least two attributes.

In some cases, the at least two attributes include a software file case name (e.g., first software file case name 172 or second software file case name 174 as described with respect to FIG. 1D) and an environment (e.g., environment 178 as described with respect to FIG. 1D). In some cases, the at least two attributes include a software file case name, an environment, and a phase (e.g., phase 176 as described with respect to FIG. 1D). In some cases, the at least two attributes include a first software file case name, a second software file case name, a phase, an environment, and a phase.

Consider an example scenario of process 600. Suppose that a version management system receives (610) version-checking request, wherein the version-checking request includes the version record attributes of software file case name: "artifact 1" and environment: "dev".

Once the version management system receives (610) the version-checking request, the version management system can search (620) a storage resource of the version management system for version-pair entries that include version record attributes that match received version record attributes ("artifact 1" and "dev").

For purposes of this example scenario, a version record identified as "Version Record 1" is stored at the storage resource of the version management system. Version Record 1 includes a version-pair entry with the following version record attributes: a first software file case: "artifact 1", a second software file case: "habitat 1", environment: "dev", and phase: "current".

Upon searching (620) the storage resource for version-pair entries that match the received version record attributes, the version management system can identify (630) Version Record 1 at the version management system because the version record attributes of Version Record 1 include "artifact 1" and "dev" (i.e., Version Record 1 includes version record attributes matching the received version record attributes). In some cases, the phase can be considered current as default.

The version management system can then provide (640) version information of Version Record 1 to a source of the version-checking request.

Embodiments of the above described systems and methods may be implemented as a computer process, a computing system, or as an article of manufacture, such as a computer program product or computer-readable medium. Certain methods and processes described herein can be embodied as software, code and/or data, which may be stored on one or more storage media that when executed by one or more processors direct the system to perform the methods and processes described herein. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system (and executable by a processing system/one or more processors) and encoding a computer program of instructions for executing a computer process. It should be understood that as used herein, in no case do the terms "storage media," "computer-readable storage media" or "computer-readable storage medium" consist of transitory carrier waves or propagating signals. Instead, "storage" media refers to non-transitory media.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method, comprising:

managing, at a version management system, a set of application programming interface (API) calls to different software file case systems including a first software file case system and a second software file case system;

receiving a version setting request for a version-pair entry, wherein the version-pair entry comprises: a first software file case name that is associated with a first software file case generated at the first software file case system and a second software file case name that is associated with a second software file case generated at the second software file case system;

obtaining, from the set of API calls to the different software file case systems, a first set of existence request rules corresponding to the first software file case system and a second set of existence request rules corresponding to the second software file case system;

generating a first existence request based on the first set of existence request rules, wherein the first existence request comprises the first software file case name;

sending the first existence request to the first software file case system;

receiving, from the corresponding first software file case system, a first positive response, the first positive response indicating that the first software file case exists at the first software file case system;

generating a second existence request based on the second set of existence request rules, wherein the second existence request comprises the second software file case name;

sending the second existence request to the second software file case system;

receiving, from the second corresponding software file case system, a second positive response, the second positive response indicating that the second software file case exists at the second software file case system; and upon receiving both the first positive response and the second positive response, setting a first version record with a first version number at the version management system, wherein the first version record comprises first version record attributes of the version-pair entry.

2. The method of claim 1, wherein the first set of existence request rules is different from the second set of existence request rules.

3. The method of claim 1, further comprising creating the version-pair entry, wherein creating the version-pair entry comprises:

receiving a version-pair creation request, the version-pair creation request comprising the first software file case name and the second software file case name;

checking that each software file case, including the first software file case and the second software file case, exists; and creating the version-pair entry for the first software file case name and the second software file case name, wherein the version-pair entry indicates that the first software file case is associated with the second software file case.

4. The method of claim 3, wherein checking that each software file case exists comprises:

determining that the first software file case is registered at the version management system; and determining that the second software file case is registered at the version management system.

5. The method of claim 3, wherein checking that each software file case exists comprises:

determining that the first software file case is not registered at the version management system; and in response to determining that the first software file case is not registered at the version management system:

obtaining, from the set of API calls to the different software file case systems, the first set of existence request rules corresponding to the first software file case system;

generating a third existence request based on the first set of existence request rules;

sending the third existence request to the first software file case system; and receiving, from the first software file case system, a third positive response indicating that the first software file case exists.

6. The method of claim 5, further comprising:

after receiving the third positive response, registering the first software file case at the version management system.

7. The method of claim 1, further comprising:

registering the first software file case at the version management system.

8. The method of claim 7, wherein registering the first software file case comprises:

receiving details of the first software file case;

obtaining, from the set of API calls to the different software file case systems, the first set of existence request rules corresponding to the first software file case system;

generating a third existence request based on the first set of existence request rules;

sending the third existence request to the first software file case system;

receiving, from the first software file case system, a third positive response; and upon receiving the third positive response, registering the first software file case at the version management system.

9. The method of claim 8, further comprising:

providing a registration view in a graphical user interface of the version management system, wherein the details of the first software file case are received via the registration view of the graphical user interface of the version management system.

10. The method of claim 1, further comprising:

receiving a promotion approval request for a specified version-pair entry including a version setting request and a promotion type;

performing an existence check of software file cases identified by the specified version-pair entry to confirm that the software file cases that are identified by the specified version-pair entry exist; and upon confirming that the software file cases exist, processing the version setting request for the specified version-pair entry.

11. The method of claim 10, wherein the software file cases that are identified by the specified version-pair entry comprise the first software file case and the second software file case, wherein performing the existence check of software file cases identified by the specified version-pair entry to confirm that the software file cases that are identified by the specified version-pair entry exist comprises:

obtaining, from the set of API calls to the different software file case systems, the first set of existence request rules corresponding to the first software file case system and the second set of existence request rules corresponding to the second software file case system;

generating a fourth existence request based on the first set of existence request rules;

sending the fourth existence request to the first software file case system;

receiving, from the first software file case system, a fourth positive response indicating that the first software file case exists;

generating a fifth existence request based on the second set of existence request rules;

sending the fifth existence request to the second software file case system; and receiving, from the second software file case system, a fifth positive response indicating that the second software file case exists.

12. The method of claim 10, further comprising:

during processing of the version setting request for the specified version-pair entry, receiving approval to promote the specified version-pair entry; and upon receiving approval to promote the specified version-pair entry, setting a second version record with a second version number at the version management system, wherein the second version record comprises second version record attributes of the specified version-pair entry and the promotion type.

13. The method of claim 1, wherein the first version record attributes comprise the first software file case name, the second software file case name, a first phase name, and a first environment name.

14. The method of claim 13, further comprising:

receiving a version-checking request for the version-pair entry, the version-checking request comprising at least two version record attributes of the version-pair entry;

searching a storage resource of the version management system for version-pair entries that match the received at least two version record attributes;

identifying the first version record from the version-pair entries that match the received at least two version record attributes; and providing at least version information of the first version record to a source of the version-checking request for the version-pair entry.

15. The method of claim 14, wherein the at least two version record attributes comprise the first software file case name and the first environment name.

16. The method of claim 14, wherein the at least two version record attributes comprise the second software file case name and the first environment name.

17. A computer-readable storage medium having instructions stored thereon that when executed by a computing system, direct the computing system to:

manage a set of application programming interface (API) calls to different software file case systems including a first software file case system and a second software file case system;

create a version-pair entry, wherein instructions to create the version-pair entry direct the computing system to:

receive a version-pair creation request, the version-pair creation request comprising a first software file case name that is associated with a first software file case generated at the first software file case system and a second software file case name that is associated with a second software file case generated at the second software file case system;

check that each software file case, including the first software file case and the second software file case, exists; and create the version-pair entry for the first software file case name and the second software file case name, wherein the version-pair entry indicates that the first software file case is associated with the second software file case;

receive a version setting request for the version-pair entry;

obtain, from the set of API calls to the different software file case systems, a first set of existence request rules corresponding to the first software file case system and a second set of existence request rules corresponding to the second software file case system;

generate a first existence request based on the first set of existence request rules, wherein the first existence request comprises the first software file case name;

send the first existence request to the first software file case system;

receive, from the first software file case system, a first positive response, the first positive response indicating that the first software file case exists at the first software file case system;

generate a second existence request based on the second set of existence request rules, wherein the second existence request comprises the second software file case name;

send the second existence request to the second software file case system;

receive, from the second software file case system, a second positive response, the second positive response indicating that the second software file case exists at the second software file case system; and upon receipt of both the first positive response and the second positive response, set a first version record with a first version number at a version management system, wherein the first version record comprises first version record attributes of the version-pair entry.

18. The computer-readable storage medium of claim 17, wherein instructions to check that each software file case exists direct the computing system to:

determine that the first software file case is registered at the version management system; and determine that the second software file case is registered at the version management system.

19. The computer-readable storage medium of claim 17, wherein instructions to check that each software file case exists direct the computing system to:

determine that the first software file case is not registered at the version management system; and in response to the first software file case being determined to not be registered at the version management system:

obtain, from the set of API calls to the different software file case systems, the first set of existence request rules corresponding to the first software file case system;

generate a third existence request based on the first set of existence request rules;

send the third existence request to the first software file case system; and receive, from the first software file case system, a third positive response indicating that the first software file case exists.

20. The computer-readable storage medium of claim 19, further comprising instructions that direct the computing system to:

after the third positive response is received, register the first software file case at the version management system.

\* \* \* \* \*